Feb. 22, 1966  J. R. KENNEDY ET AL  3,236,457
COMPOSITE SPRAY CONTAINER ASSEMBLY
Filed Aug. 21, 1963  2 Sheets-Sheet 1

INVENTORS
JOHN R. KENNEDY
JOHN H. LADD
BY
McLaughlin & Cahill
ATTORNEYS

Feb. 22, 1966  J. R. KENNEDY ET AL  3,236,457
COMPOSITE SPRAY CONTAINER ASSEMBLY
Filed Aug. 21, 1963  2 Sheets-Sheet 2
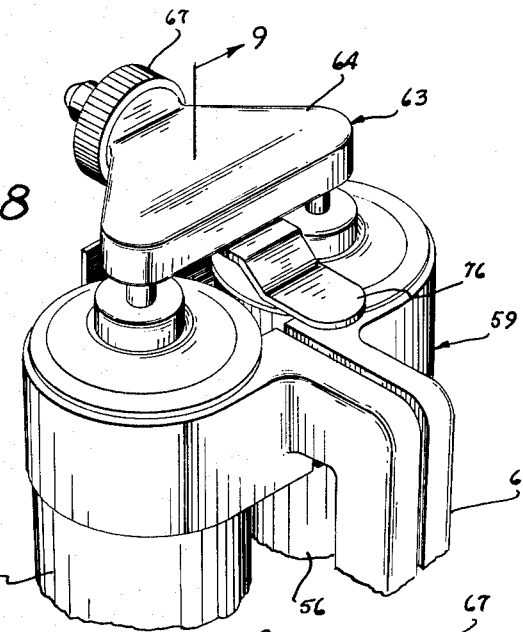
fig. 8
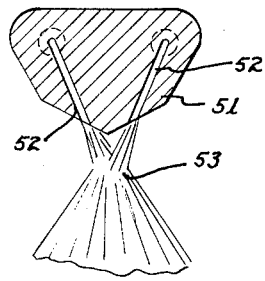
fig. 7
fig. 13
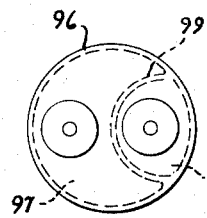
fig. 12
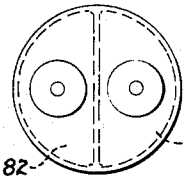
fig. 10
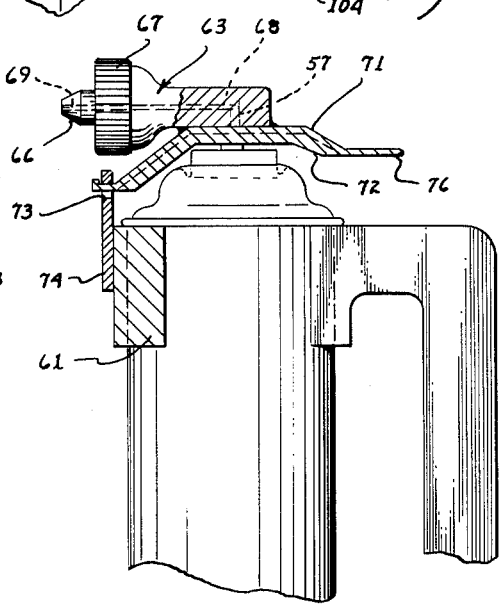
fig. 9
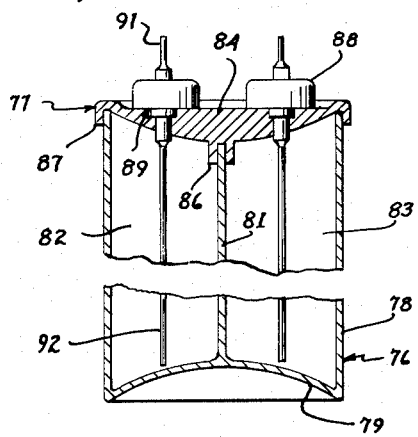
fig. 11
INVENTORS
JOHN R. KENNEDY
JOHN H. LADD
BY
McLaughlin & Cahill
ATTORNEYS United States Patent Office 3,236,457
Patented Feb. 22, 1966

3,236,457
COMPOSITE SPRAY CONTAINER ASSEMBLY
John R. Kennedy, 1751 W. Klamath Drive, Tucson, Ariz.,
and John H. Ladd, San Jose Station, Bisbee, Ariz.
Filed Aug. 21, 1963, Ser. No. 303,507
3 Claims. (Cl. 239—304)

Our invention relates to an improved composite spray container assembly. It relates more in particular to such an assembly adapted for home and limited use and in which is a plurality of liquids is simultaneously sprayed from separate container compartments and mixed to produce a composite such as a foam plastic.

There are many instances in which two or more fluids are premixed and delivered to a point of application for the accomplishment of a particular result. Frequently such spraying can be accomplished only at a factory site or by a professional with special equipment, or by the use of substitute methods or techniques, so that there are many instances in which a method and/or product would be available to an individual home owner if suitable spray equipment were available.

Illustratively, polyurethane foam of the three usual types, namely, rigid, non-rigid, and semi-rigid are produced in a factory and a device to be made from such foam plastic must accordingly be made completely in a factory. Blocks, blankets and strips of polyurethane foam plastic are available for purchase in some retail stores so that the general public is in a position to fashion certain devices therefrom, but the use to which such materials can be put is limited. Polyurethane foam plastics are generally produced by mixing two liquids together, one of which includes the plastic and part of the foaming requirements while another second liquid contains the foaming material and other mixes required to produce a final product with proper characteristics. It is known that a cellular material may be produced in several different ways, but in general the cellular material is a reaction product of an isocyanate group, carboxylic group and water. A suitable method is to mix together glycerine, adipic acid and a small amount of phthalic anhydride, and then mix this mixture with approximately an equal weight of diisothyanate to which has been added a relatively small proportion of dioctyl sulfosuccinate. These materials will produce a cellular material, characteristic of plastic foams. Depending upon the materials collected, refrigeration prior to mixture may be required. Normally, when two liquids are pre-prepared, they are frequently used in a proportion of 1 to 1, or up to 1.5 to 1, for example. Other materials which may be mixed are blends of paints which when sprayed together produce a fleckey appearance, or known materials for producing foam for extinguishing fires. An illustrative list of fluids which may be mixed together to produce some particular desired result would be quite lengthy.

The principal object of the present invention is the provision of an improved composite spray container assembly particularly adapted for home use in simultaneously spraying and mixing at least two fluids.

Another object is the production of the spray assembly of the type identified in which a portion of the assembly may be preassembled with its ingredients at a factory site and comprises a "throw away" package and a portion of the assembly may comprise a permanent unit for use with the "throw away" package.

Still another object is the production of a composite spray container assembly in which the relative proportions of fluids to be mixed and applied are predetermined.

Other specific objects and features of the invention will be apparent from the following detailed description taken with the accompanying drawings, wherein FIG. 1 is a perspective view showing one embodiment of the complete assembly;

FIG. 7 is a fragmentary sectional view showing a modified spray nozzle;

FIG. 8 is a fragmentary perspective view showing an embodiment of the invention employing two separate containers;

FIG. 9 is a fragmentary vertical sectional view taken on the line 9—9 of FIG. 8;

FIGS. 10 and 11 show a modification of the container;

FIG. 12 is a plan view of a further modification; and

FIG. 13 is a sectional view showing a modified nozzle.

Figure 1:
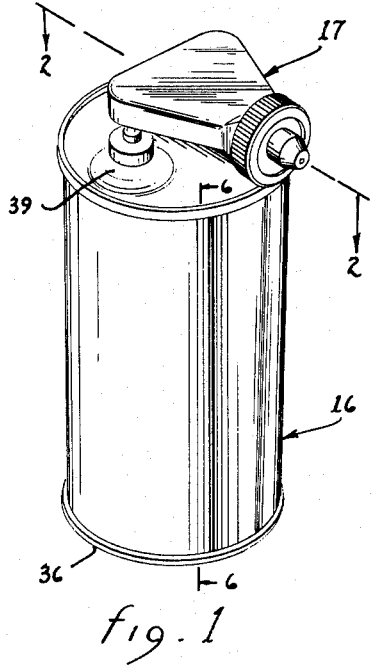
Figure 2:
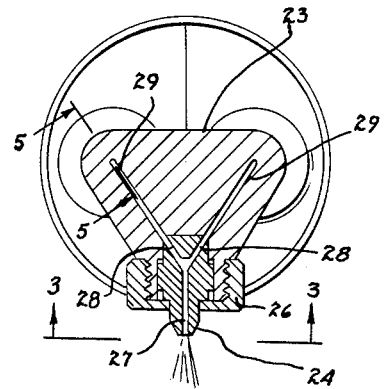
FIG. 2 is a planned sectional view taken on the line 2—2 of FIG. 1 looking in the direction of the arrows.
Figure 3:
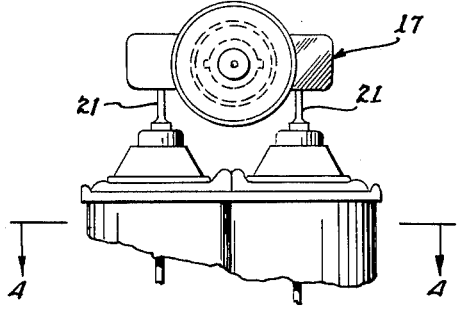
FIG. 3 is a fragmentary, slightly enlarged elevational view of the top portion of the assembly looking from the line 3—3 in FIG. 2.

Referring now first to FIGS. 1 through 6, inclusive, the composite assembly comprising the embodiment of the invention shown in these figures includes a special container indicated generally by the reference character 16 and a special nozzle assembly indicated generally by the reference character 17. The container 16 includes two compartments, 18 and 19, each with a depressable small fluid delivery tube 21 supporting a nozzle assembly 17 and each equipped with a valve mechanism such as indicated generally by the reference character 22 in FIG. 5 for delivery of the fluid to the nozzle assembly when the said nozzle assembly 17 is depressed.

The nozzle assembly comprises a body portion 23, a removable nozzle 24, and a nozzle retainer nut 26. The nozzle 24 has a fluid delivery orifice 27 in communication with a pair of oblique passageways 28 communicating with passageways 29 in the body portion 23. These passageways 29 are directed downwardly at 31 (FIG. 5) and are shaped and dimensioned to receive the tubes 21 snugly and to support the nozzle assembly in position. The parts are so constructed and arranged that when the nozzle assembly is pressed downwardly, fluid will be delivered in predetermined portions through the passageways 31 and 29 for mixture in the nozzle chamber and delivery through the nozzle opening 27. The fluid within the chambers 18 and 19 is pressurized by means of an innocuous gas which may or may not be one of the constituents combined in the nozzle to produce a desired result and end product.

Container 16 may be produced in various ways and of various materials. In the embodiment shown, container 16 comprises a pair of semispherical cross-sectional metal cans having sidewalls 32, bottom 33 and top 34. The bottom ring 36 and top ring 37 are frictionally held tightly around the two container portions to produce the effect of a single tubular container. Other means of attachment may be used, however, such as by merely soldering the two halves together.

Figure 5:
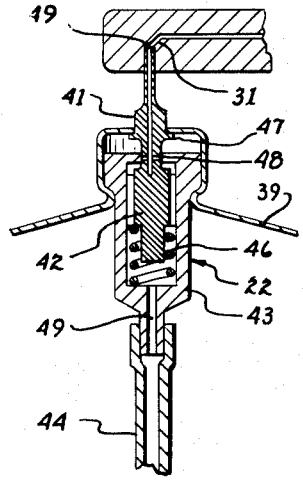
FIG. 5 is an enlarged, fragmentary vertical sectional view taken on the line 5—5 of FIG. 2.
Figures 4, 6:
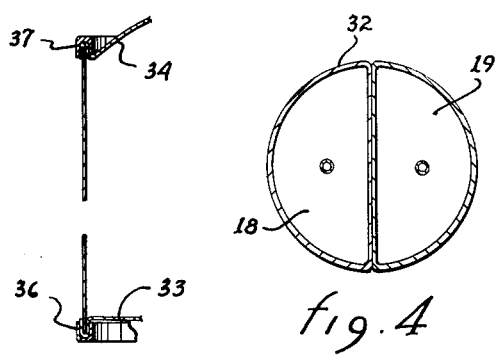
FIG. 4 is a sectional view taken on the line 4—4 of FIG. 3 showing one form which the two chambers provided for in this particular embodiment are constructed and proportioned.
FIG. 6 is a fragmentary sectional view taken on the line 6—6 of FIG. 1.

Each of the containers forming the container assembly 16 has a formed and inserted top portion 39 supporting the valve assembly 22. While this valve assembly may take various forms, one suitable form is shown in FIG. 5. In this form, tube 21 comprises an integral projection from a specially shaped valve member 41 having a fluted bottom portion 42 extending down into an enlarged tubulation 43 to which is attached a bottom tube 44 extending substantially to the bottom of the chamber in which the valve is placed. A relatively small coiled compression spring 46 is disposed between the member 42 and the bottom of the larger tubulation 43 so that the valve member 41 appears normally held upwardly and an integral annular reset 47 engages against a formed portion of the inserted top member 39. At this position, radial openings 48 communicating with a vertical passageway 49 are out of communication with the interior of the larger tubulation 43. The interior portion of this tubulation 43, however, is normally in contact with the pressurized fluid content in the chamber through a vertical passageway 49 communicating with the interior of tube 44. The fluid under pressure is delivered to the inside of the tubulation 43 and along its fluted sides to the top thereof, but cannot communicate with radial openings 48 so that there is no delivery of fluid to the nozzle. When pressure is applied, however, the spring 46 is compressed and the valve member 41 is forced downwardly to place the radial passageways 46 in communication with the interior portion of the rigid tubulation 43 so that fluid under pressure can be delivered through the passageways provided to and through the nozzle 24. The rate of flow of fluid is predetermined by controlling the pressure within the chamber and the frictional resistance which the fluid encounters, a resistance normally predetermined by the size of the smallest orifice through which the fluid must pass. Thus, assuming that the viscosity of the fluid in the two chambers 18 and 19 was the same, the contents of such two chambers would be delivered to and through the nozzle in mixed condition in a ratio of one part of each, assuming uniform pressure in the two chambers and uniform resistance in the passageways through the valves.

For certain types of fluids, it is desirable that mixing occur exteriorly of the nozzle so that the mixing will not be so thorough or complete. In FIG. 7 we show such a nozzle assembly in which a body portion 51 has two converging fluid delivery passageways 52 through which fluid is delivered from a suitable valve body from a suitable pair of chambers as shown, for example in FIGS. 1–6. This form of the invention does not have a special nozzle but depends only on the fluids converging at an apical location 53 at which the two passageways 52 would meet if they were continued on into space.

The form of the invention shown in FIGS. 8 and 9 employs separate containers 56, each of which has any usual container construction and each of which has an upwardly projecting fluid discharge tube 57 which acts to control a valve such as shown in FIG. 5 when depressed.

Containers 56 are supported by a support end nozzle assembly indicated generally by the reference character 59 and comprising a split container retaining frame 61 with an integral handle 62 for supporting the entire composite assembly. The nozzle assembly 63 may be substantially identical with the nozzle assembly 17 in our first described embodiment so far as control passageways are concerned, but it is of necessity modified to meet the requirements of the two containers and the separate assembly 59 as will be made clear.

The nozzle assembly 63 includes a body portion 64 with a nozzle 66 attached thereto by means of a knurled locking nut 67. Suitable passageways indicated by the reference character 68 in FIG. 9 receive the tubes 57 and as in the main embodiment, the passageways converge to deliver the two fluids from the two containers through the nozzle 66, and the nozzle, of course, has the usual nozzle passageway 69 (FIG. 9) for discharging the mixed fluids. In the embodiment shown, mixing will, of course, occur before discharge from the nozzle as in the first described embodiment, or it could be at a position in front of the nozzle assembly as shown in FIG. 7.

A trigger mechanism includes a trigger arm 71 of relatively thin material to conserve weight and preferably reinforced by an integral gusset 72 as shown in FIG. 9. A forward portion of the trigger arm extends through an opening 73 in a fulcrum plate 74 attached to the frame 61 so that when a thumb piece portion 76 of the trigger arm is depressed the trigger arm will pivot with respect to the fulcrum plate 74 and the body portion 64 will be moved downwardly to depress the upwardly projecting tubes 57 and release the fluid in the two containers.

The structures heretofore disclosed would normally comprise a container formed of relatively thin metal but the containers may be formed of any suitable material in any convenient manner such as by molding the same from plastic as shown in FIGS. 10 and 11. In accordance with this construction, a container bottom 76 is separately molded of plastic and then suitably joined as by plastic welding to a separately molded top 77. The bottom 76 has a cylindrical side wall 78 and concavo-convexed bottom wall 79, with a septum 81 dividing the container into two compartments 82 and 83. The top 77 includes a body portion 84 with a bottom recess in a transverse projection 86 for receiving the top of the septum 81 and a skirt 87 engaging outside the top edge of the annular side wall 78. Suitable caps 88 which may be separately formed or comprise a part of the body portion 84 carry a suitable valve assembly 89 with an upwardly projecting delivery tube 91 and a bottom receiving tube 92 extending down to substantially the bottom of the chamber in which the tube is placed. This form of the invention will utilize a nozzle assembly such as shown in FIG. 1 and the operation will be the same as in FIG. 1.

The FIG. 12 embodiment for all practical purposes may be substantially identical with the embodiment shown in FIGS. 10 and 11 with the exception that the space defined by the annular side wall 96 is divided into two 97 and 98 of different size by means of a specially designed septum 99. In all other respects FIG. 12 embodiment may conform with the configuration in FIGS. 10–11 embodiment.

It should be apparent to those skilled in the art that a primary purpose of our present invention is the provision of means for accomplishing in the home or at times in industrial environments, effects and products that are normally performed by specialists in a highly specialized environment. As an example, it sometimes occurs that in mines, an open seam is to be treated or filled, and it is necessary to transport a relatively large amount of heavy equipment to a location to perform a task which could be readily handled by means of the present invention. It is not the purpose of our invention to provide equipment for specialized use such as the production of commercial products or functions, but rather to make available to the non-specialist equipment for occasional or emergency use for the accomplishment of a specialized function.

In FIG. 7, we disclosed an inexpensive device which is intended to be substituted for a more expensive nozzle. It should be understood, however, that in order to be certain of a proper spray and mixing of the two liquids, a number of orifices may be required. Alternatively, one may finish the body portion 101 to have an internal mixing chamber 102 with the separate passageways 103 from the two chambers delivering into the mixing chamber 102 so as to produce a swirling action. The discharge is through discharge orifice 104, and at this point the two liquids are quite thoroughly mixed.

As pointed out hereinabove, the rate of feed of the two fluids from the two chambers may be controlled in various ways such as by controlling the size of a delivery passageway or orifice or controlling the pressure within the chamber carrying the fluid to be dispensed. In some instances it is possible to change the relative proportion of solute material and solvent in a fluid so that equal proportions of fluid from the two chambers will be delivered to the nozzle. When proportions of liquid delivered are the same, then there is no problem such as could result if one chamber would become completely exhausted and another chamber still has a substantial amount of unused fluid in it. One of the advantages of separate standard containers such as shown in FIG. 8 is that an exhausted container can always be replaced by a new full container to use up the remaining associated liquid. In many instances, however, only a limited amount of a vinyl material such as foam plastic for example would be required and in such a case, there is a definite advantage in so proportioning to volumetric displacement of the container and its chambers as to cause the two chambers to be emptied at the same time even though the rate of feeding of the two fluids may be different. A construction such as shown in FIG. 12 under such circumstances would be warranted, but it is also possible to make the chambers of identical diameter but one of less height than the other, or for that matter, in a standard package to blend composite container with one chamber full and the other chamber party full to correspond to required rate of use of the two fluids. An advantage would then accrue if rate of flow were controlled by proportioning the pressure within the two chambers or controlling the rate of delivery by proportioning the valves 22, it being understood that the control may be in the nozzle portion of the device should there be any particular advantage in doing so.

It is not our intention to limit the invention by the disclosed details hereof but its scope is defined by the claims.

We claim:
1. A composite spray container assembly comprising,
   (a) a plurality of containers, each having a chamber therein, and said chamber being unconnected,
   (b) a valve, including a valve spring, associated with each chamber for delivering a fluid under pressure therefrom,
   (c) discharge tubes, one associated with each such valve spring pressed upwardly and having their top ends exposed through which fluid from the valves is adapted to be discharged,
   (d) a nozzle assembly having a body portion with passageways leading to each such valve, each such passageway having a vertical terminus receiving one of said tubes to support the nozzle assembly directly on the container unit, such passageways converging to discharge the two fluids in mixed relation when the nozzle assembly is pressed downwardly with respect to the container units,
   (e) a frame shaped to be held in one hand and supporting said containers in side by side relation, and
   (f) a thumb piece carried by the nozzle assembly and engageable by the thumb while said frame is held in the hand.

2. An assembly as defined in claim 1 wherein said chambers are of disproportionate sizes to carry fluids required to be mixed on discharge in proportions other than 1 to 1.

3. A composite spray container assembly comprising a
   (a) a plurality of containers of standary type, each having,
      (1) a single chamber,
      (2) a valve in said chamber for controlling delivery of fluid therefrom,
      (3) a discharge tube projecting upwardly from the container, said tube being spring pressed in an upward direction but adapted to be pressed downwardly to actuate said valve and release fluid under pressure in said chamber,
   (b) a frame supporting said plurality of containers in upright parallel relation, said frame having a handle,
   (c) a nozzle unit having a plurality of passageways, each with a vertical terminus for receiving one of said discharge tubes, said passageways convering to mix the fluid in the two containers as an incident to their discharge, and
   (d) a trigger arm secured to said nozzle unit and pivoted with respect to said frame, said trigger having a thumb piece contiguous to said handle for depressing the trigger arm and the said nozzle unit, to thereby depress such discharge tubes, actuate said valves and discharge the fluid in the container.

References Cited by the Examiner

UNITED STATES PATENTS

| | | | |
|---|---|---|---|
| 2,876,935 | 3/1959 | Lindberg | 222—145 |
| 2,941,696 | 6/1960 | Homm | 239—306 |
| 2,973,883 | 3/1961 | Modderno | 239—304 |
| 3,042,311 | 7/1962 | Edwards et al. | 239—419 |
| 3,045,925 | 7/1962 | Giangualano | 239—306 |
| 3,049,439 | 8/1962 | Coffman | 239—424 |
| 3,084,871 | 4/1963 | Puglis | 239—303 |
| 3,135,467 | 6/1964 | Greenman | 239—414 |

M. HENSON WOOD, JR., *Primary Examiner.*

EVERETT W. KIRBY, *Examiner.*